(12) United States Patent  (10) Patent No.: US 8,157,164 B1
Billman                    (45) Date of Patent:     Apr. 17, 2012

(54) SYSTEMS AND METHODS FOR PROVIDING FINANCIAL CARD VIA AUTOMATED TELLER MACHINE

(75) Inventor: Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 260 days.

(21) Appl. No.: 12/425,083

(22) Filed: Apr. 16, 2009

(51) Int. Cl.
*G06K 19/00* (2006.01)
(52) U.S. Cl. ............... 235/379; 235/375; 235/380
(58) Field of Classification Search .............. 235/379
See application file for complete search history.

(56) References Cited

U.S. PATENT DOCUMENTS

| 4,641,239 A * | 2/1987 | Takesako ............... 705/41 |
| 5,949,046 A * | 9/1999 | Kenneth et al. ......... 235/380 |
| 6,220,511 B1 | 4/2001 | Holec et al. |
| 6,446,832 B1 | 9/2002 | Holec et al. |
| 7,096,198 B1 * | 8/2006 | Cuervo ................ 705/39 |
| 2001/0008253 A1 | 7/2001 | Holec et al. |
| 2005/0167487 A1 | 8/2005 | Conlon et al. |
| 2007/0156837 A1 | 7/2007 | Elgar et al. |
| 2007/0267486 A1 * | 11/2007 | Ferrara et al. .......... 235/380 |

OTHER PUBLICATIONS

"DataCard MX600 Card Issuance System, Prepare to be Amazed", Datacard Group, 2006, 14 pages.

* cited by examiner

*Primary Examiner* — Thien M. Le
*Assistant Examiner* — Christle Marshall
(74) *Attorney, Agent, or Firm* — Perkins Coie LLP

(57) ABSTRACT

An institution system may approve a user for a financial card. The institution system may notify the user that an application for the financial card has been approved and may advise the user to go to an automated teller machine (ATM) to obtain the financial card. The ATM may generate a financial card and issue the financial card to the user. The financial card generated and issued by the ATM may be a newly issued card for the user, a card customized by the user, or a replacement card issued for the user.

19 Claims, 5 Drawing Sheets

SYSTEMS AND METHODS FOR PROVIDING FINANCIAL CARD VIA AUTOMATED TELLER MACHINE

BACKGROUND

Financial cards include non-stored value cards, such as credit cards and charge cards, as well as debit cards. A credit card is part of a system of payments named after the small card (typically plastic) issued to users of the system. It is a financial card entitling its holder to buy goods and services based on the holder's promise to pay for these goods and services. The issuer of the credit card grants a line of credit to the card owner (also referred to herein as the user) from which the user can borrow money for payment to a merchant or as a cash advance to the user.

A credit card allows the user to revolve their balance at the cost of having interest charged. A credit card is different from a charge card as a charge card requires the balance to be paid in full each month. Most credit cards and charge cards are issued by local banks or credit unions, and are the same shape and size as specified by the ISO 7810 standard.

A debit card (also known as a bank card or check card) is a card which provides an alternative payment method to cash when making purchases. Functionally, it can be called an electronic check, as the funds are withdrawn directly from either the bank account from the remaining balance on the card. Debit cards are issued in the name of individual account holders while stored value cards are anonymous.

Debit cards, credit cards, and charge cards, as well as other non-stored value cards, are issued after an account or application for an account has been approved by the institution providing the card. After receiving the card, the user may use the card to make purchases at merchants accepting that card.

Card security relies on the physical security of the card itself as well as the privacy of the credit card number. Therefore, whenever a person other than the card owner has access to the card or its number, security is potentially compromised. Card fraud refers to theft and fraud committed using a credit card, charge card, debit card, or any similar payment mechanism as a fraudulent source of funds in a transaction. The purpose may be to obtain goods without paying or to obtain unauthorized funds from an account. Card fraud is also an adjunct to identity theft.

In issuing a financial card to the user, the card is mailed directly to the user. The mailing of the financial card is a highly insecure process. The card may be intercepted in the mail by someone other than the true card owner, thereby increasing the likelihood of card fraud and identity theft.

SUMMARY

An institution system may approve a user for a financial card. The institution system may notify the user that an application for the financial card has been approved and may advise the user to go to an automated teller machine (ATM) to obtain the financial card. The ATM may generate a financial card and issue the financial card to the user.

In an implementation, the user may customize the financial card. The user may provide customization information comprising one or more designs, images, and/or layouts that are to be used in the generation of the financial card. The user may provide the customization information to the institution system or to the ATM prior to the ATM generating the financial card.

In an implementation, an event may occur in which a replacement financial card may be warranted. The event may comprise an expiration of the financial card or the compromise of the card number, for example. The user may be notified of the event by the institution system and may be advised to go to an ATM to obtain the replacement financial card. The ATM may generate and issue a replacement financial card to the user.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
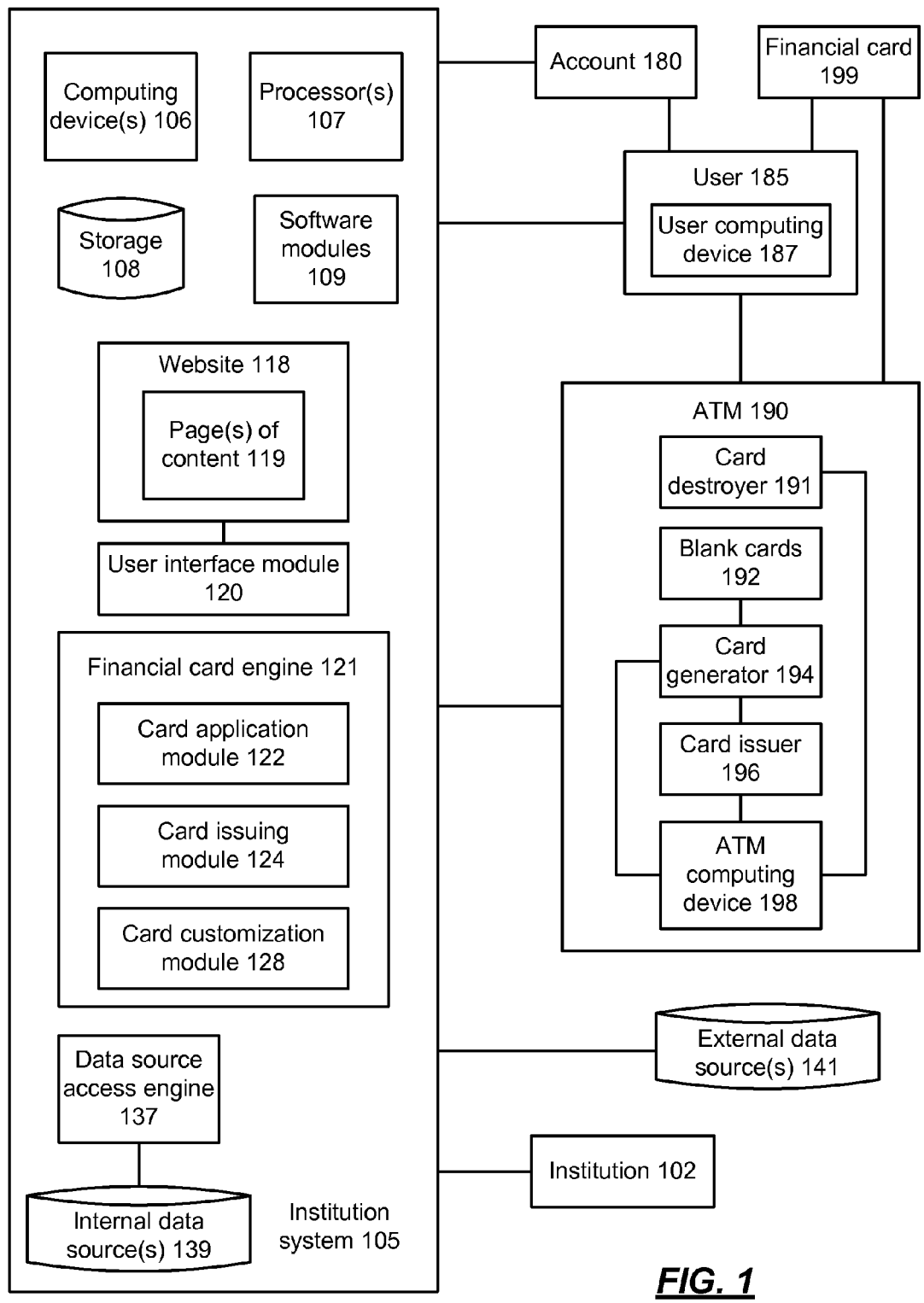
FIG. 1 is a block diagram of an implementation of a system that may be used in conjunction with providing a financial card via an automated teller machine (ATM)

FIG. 1 is a block diagram of an implementation of a system that may be used in conjunction with providing a financial card 199 via an automated teller machine (ATM) 190. An institution system 105 may be affiliated with an institution 102 which may be any type of entity capable of providing financial services, such as issuing financial cards, maintaining accounts involving financial cards, and/or processing transactions involving financial cards or associated accounts. For example, the institution 102 may be any type of financial services company, bank, etc. The financial card 199 may be any type of non-stored value card, such as a credit card or a charge card, or a debit card, for example.

A user 185 and an associated user computing device 187 are shown. In an implementation, the user 185 may be an individual who owns an account 180 that is held by the institution and accessible via the institution system 105. The account 180 may be any type of account that may be associated with a financial card, such as a credit card account, a charge card account, or an account for depositing funds and from which funds may be withdrawn, such as a savings account, a checking account, a brokerage account, and the like. The computing device 187 may be any type of computing device such as a personal computer (PC) or handheld computing device or a mobile device, such as a personal digital assistant (PDA), a mobile phone, a smart phone, and the like.

The ATM 190 is a computerized telecommunications device that provides the user 185 (as well as other customers or of the institution 102 or users, for example) with access to financial transactions in a public space without the need for a human clerk or bank teller. The ATM 190 may be placed anywhere, such as, for example, near or inside the premises of a bank or in a location such as a shopping center mall, an airport, a grocery store, a gas station, a restaurant, or any place people may gather. The ATM 190 may have a sign indicating the name of the bank or institution owning, operating, or otherwise affiliated with, the ATM 190.

Although ATMs were originally developed as just cash dispensers, they have evolved to include many other bank related and non-bank related functions. ATMs include many functions such as providing deposit currency recognition and acceptance, facilitating payment of routine bills, fees, and taxes, printing bank statements, loading monetary value into stored value cards, selling items such as postage stamps, lottery tickets, train tickets, concert tickets, shopping mall gift certificates, etc., providing games and promotional features, providing check processing, etc.

In an implementation, the ATM 190 may generate a financial card 199 and issue the financial card 199 to the user 185. As described further herein, the financial card 199 generated and issued by the ATM 190 may be a newly issued card for the user 185, a card customized by the user 185, or a replacement card issued for the user 185.

In an implementation, the user 185 may apply for a card and an associated account from the institution 102 via the institution system 105, e.g., via an application provided on a website 118 of the institution system 105, via an application that the user 185 fills out and mails, faxes, or emails to the institution system 105, or via an application taken over the telephone by a representative of the institution system 105, for example.

The institution system 105 may receive the application and may process the application, perform underwriting in an implementation, and approve the user 185 for the financial card 199 and an associated account. The institution system 105 may notify the user 185 that the application for the financial card 199 has been approved and may advise the user 185 to go to the ATM 190 to obtain the financial card 199. The user 185 may be provided with a list of suitable ATMs, any one of which may generate and dispense the financial card 199 to the user 185. In an implementation, the ATM 190 may be associated or affiliated with the institution 102.

The user 185 may visit the ATM 190 and may be identified and authenticated by the ATM 190. Any technique may be used for identification and authentication, such as receiving and analyzing one or more pieces of identification of the user 185, such as a driver's license, other financial cards issued to the user 185, and/or biometrics of the user 185 such as fingerprints, eye retinas and irises, voice patterns, facial patterns, and hand measurements. In an implementation, the user 185 may provide a previously issued financial card of the institution 102 into the ATM 190 and be identified and authenticated based on the previously issued financial card.

The ATM 190 may perform the identification and authentication alone or in conjunction with the institution system 105. The ATM 190 may communicate over a communications network with the institution system 105 to perform the identification and authentication processing.

After the user 185 is identified and authenticated, the ATM 190 may receive information that is to be provided on the card from the institution 105. As with the identification and authentication, in an implementation, the communication may be performed through an ISO 8583 messaging system, though any communication technique(s) may be used. In addition to techniques employed for transaction security and secrecy, the communications traffic between the ATM 190 and the institution system 105 may also be encrypted via methods such as secure sockets layer (SSL) or transport layer security (TLS).

The ATM 190 may connect to the institution system via a dial-up modem over a telephone line, directly via a leased line, or via an Internet connection. Common lower-level layer communication protocols that may be used by the ATM 190 to communicate with the institution system 105 include SNA (systems network architecture) over SDLC (synchronous data link control), X.25, and TCP/IP over Ethernet, for example.

Sensitive data in ATM transactions may be encrypted with data encryption standard (DES) or triple DES. Remote key loading techniques may be used to ensure the secrecy of the initialization of the encryption keys in the ATM 190. Message authentication code (MAC) or partial MAC may also be used to ensure messages have not been tampered with while in transit between the ATM 190 and the institution system 105.

The ATM 190 may generate the financial card 199 using the information from the institution system 105 (and the user 190 in an implementation) and may issue the financial card 199 to the user 185. The information for the financial card 199 may be provided to the ATM 190 from the institution system 105 pursuant to a request made to the institution system 105 from the user 185 and/or the ATM 190.

The ATM 190 may comprise a central processing unit (CPU) to control the user interface and transaction devices, a magnetic and/or chip card reader to identify the user, a personal identification number (PIN) pad, a secure cryptoprocessor (a dedicated computer or microprocessor for carrying out cryptographic operations, embedded in a packaging with multiple physical security measures, which provides tamper resistance), a display used by the user for performing the transaction, function key buttons or a touchscreen used to select the various aspects of the transaction, and a record printer to provide the user with a record of their transaction. Such components may be comprised within the ATM computing device 198 shown in FIG. 1. An example computing device is described with respect to FIG. 5.

Recently, due to heavier computing demands and the falling price of computer-like architectures, ATMs have moved away from custom hardware architectures using microcontrollers and/or application specific integrated circuits to adopting a hardware architecture that is very similar to a PC. Many ATMs are now able to use operating systems such as Microsoft Windows and Linux. With the migration to commodity PC hardware, standard commercial off-the-shelf operating systems and programming environments can be used inside of ATMs. Typical platforms used in ATM development include RMX, OS/2, and Microsoft operating systems. Java, Linux, and Unix may also be used in these environments.

The ATM 190 may also comprise a vault to store the parts of the machinery having restricted access, and a housing for aesthetics and to attach signage to. Such components are well known and not shown in FIG. 1.

The ATM 190 may comprise blank cards 192 that may be used in the generation of financial cards for users. The blank cards 192 may be stored in the vault of the ATM 190, for example. The ATM 190 may comprises a card generator 194 that receives information from the institution system 105 that is to be provided onto the financial card 199, and provides the information onto one of the blank cards 192 during the generation of the financial card 199. The ATM 190 and the institution system 105 may communicate to tie the financial card 199 to an account of the user 185.

It is contemplated that the blank cards 192 may comprise information, designs, logos, etc. pertaining to the institution 102, the ATM 190, or another entity, for example; however, the blank cards 192 do not comprise information directed to the user 185 such as the name of the user 185 or an account number of the user 185. In an implementation, the blank cards 192 do not comprise a card number or an expiration date. Such information (e.g., a user name, a card number, an expiration date, etc.) may be provided on the card by the ATM 190 when generating the financial card 199 from one of the blank cards 192, as described further herein.

Card information is stored and provided in a number of formats. Account numbers are often embossed or imprinted on the financial card 199, and a magnetic stripe on the back contains the data in machine readable format. Fields can vary, but the most common include name of user 185, card number or account number, expiration date, verification, CVV (card verification value), or other card security code. The card generator 194 may comprise an embosser, a printer, an encoder, a card programmer, etc., that may be used to provide the information onto the financial card 199.

In an implementation, the card generator 194 may print designs on the financial card 199, such as one or more institution logos or identifiers and/or one or more designs or images that may be selected by the user 185. In an implementation, the user 185 may select the designs or images at the ATM 190, may provide the designs or images to the ATM 190, or may have previously selected and/or provided the designs or images via the institution system 105.

In an implementation, the ATM 190 may only generate and issue financial cards for the institution 102 that operates the ATM 190. In an alternate implementation, the ATM 190 may generate and issue financial cards for any institution.

The ATM 190 may comprise a card issuer 196 that issues the financial card 199 to the user 185 after the financial card 199 has been generated. The card issuer 196 may confirm receipt from the user 185 that the user 185 has received the financial card 199. The card issuer 196 may also activate the financial card 199, either pursuant to one or more actions by the user 185 or automatically prior to, or after, dispensing the financial card 199, depending on the implementation.

In an implementation, the ATM 190 may comprise a card destroyer 191 that may destroy (e.g., shred, cut, etc.) unused or no longer valid financial cards, such as a financial card that has expired or a financial card for which a replacement card has been issued.

The institution system 105 may include a user interface module 120, a financial card engine 121, and a data source access engine 137. The user interface module 120 may generate and format one or more pages of content 119 as a unified graphical presentation that may be provided to the user computing device 187 as an output from the financial card engine 121. In an implementation, the page(s) of content 119 may be provided to the user computing device 187 via a secure website 118 associated with the institution system 105. On the website 118, the user 185 may be presented with information pertaining to the account 180, an application for a financial card, the financial card 199, and/or customization information for the financial card 199, as described further herein. An example computing device, such as an example user computing device 187, is described with respect to FIG. 5.

The user 185 may communicate with the institution system 105 by way of a communications network such as an intranet, the Internet, a local area network (LAN), a wide area network (WAN), a public switched telephone network (PSTN), a cellular network, a voice over Internet protocol (VoIP) network, and the like. The user 185 may also communicate with the institution system 105 by phone, email, instant messaging, text messaging, web chat, facsimile, mail, and the like.

The financial card engine 121 may provide, receive, and process an application for the financial card 199 using a card application module 122. In an implementation, the card application module 122 may obtain data from internal data source(s) 139 and/or external data source(s) 141 by the data source access engine 137 that may be used in the generation of an application for the financial card 199. Data may also be requested and received from the user 185 (e.g., via the website 118). Such data may also be used in providing the application to the user 185, receiving the application from the user 185, and processing the application.

The financial card engine 121 may issue the financial card 199 to the user 185 (alone or in conjunction with the ATM 190) after approving the application for the financial card 199. A card issuing module 124 may determine usage parameters, such as spending limits on the financial card 199, geographic regions where the financial card 199 may be used, which goods and services may be purchased with the financial card 199, and which merchants may accept the financial card 199 for purchases, for example. The card issuing module 124 may obtain data from the internal data source(s) 139, the external data source(s) 141, and/or the user 185 and use this data along with tools, applications, and aggregators, for example, to determine the parameters, in an implementation.

The card issuing module 124 may provide information to the user 185 regarding the approved application and how to obtain the financial card 199 (e.g., by going to the ATM 190 for issuance of the financial card 199). The card issuing module 124 may provide instructions and information to ATM 190 regarding the generation and issuance of the financial card 199 to the user 185 via the ATM 190. The instructions and information may be directed to identifying and authenticating the user 185 and the information that is to be provided onto the financial card 199. The card issuing module 124 may also provide activation information and/or instructions to the ATM 190 to activate the financial card 199 for the user 185. In an implementation, the card issuing module 124 may activate the financial card 199 for the user 185.

In an implementation, the card manufactured at the ATM 190 could be of lesser stock then a traditional financial card, sacrificing long-term durability. In an implementation, the financial card 199 could be valid for a fixed period of time. This type of card would be useful for travelers and may function as a traveler's check in credit, charge, or debit card form where at the end of the travel period the financial card 199 would no longer function.

In an implementation, the user 185 may customize the financial card 199 via a card customization module 128. Such customization may allow personalization of the financial card 199 by the user 185. For example, the user may select or provide one or more images or designs for the financial card 199 and/or may arrange the images, designs, and other data on the financial card 199 that will be generated and issued to them. In an implementation, the user 185 may use the user computing device 187 to provide customization information (e.g., images, designs, and/or arrangements) for the financial card 199 to the card customization module 128. The card customization module 128 may store the customization information in storage, such as storage 108 or internal data source(s) 139. The customization information may be provided to the card issuing module 124, via the card customization module 128 or the storage, and may be provided to the ATM 190 for use in generating the financial card 199 for the user 185.

In an implementation, the card customization module 128 may provide options regarding layout, images, designs, etc.

for the financial card 199 to the user 185 via the website 118. The user 185 may select which one or more options they would like for the financial card 199. Such selected options may be stored and/or provided by the card customization module 128 as customization information for subsequent use in generating the financial card 199 for the user 185.

In this manner, the user 185 may design the financial card 199 (e.g., via the user computing device 187), and may later retrieve it at the ATM 190. Thus, the financial card 199 is issued to the user 185 without a mail event.

In an implementation, the user 185 may customize the financial card 199 to comprise information pertaining to the user 185, such as a user photograph or picture, an account number or identifier of a user account, medical information of the user 185, and contact information of the user 185 and friends or family members of the user 185, for example. The information may be encoded or in the clear. In this manner, in an implementation, the financial card 199 may also serve as an identification card of the user 185.

The financial card engine 121 has access to data, files, and documents pertaining to the user 185 as well as any other data, files, and documents that are currently stored by the institution system 105 as well as external data, files, and documents that may be useful in processing an application for the financial card 199 and/or issuing the financial card 199 to the user 185. Data pertaining to the user 185 and/or the user account(s) may be retrieved from internal data source(s) 139 and/or external data source(s) 141. The retrieved data may be stored centrally, perhaps in storage 108. Information may also be provided to the institution system 105 from the user 185.

Internal data source(s) 139 may contain data, metadata, email, files, and/or documents that the institution system 105 maintains pertaining to the user 185, such as personal data such as name, physical address, email address, etc., as well as other account information. The institution system 105 may access this information when processing or issuing the financial card 199 or setting the usage parameters, for example.

A user access system may be communicatively coupled to the financial card engine 121 and may be configured to send machine-readable instructions to the financial card engine 121. As mentioned above, the institution system 105 may provide a unified graphical presentation output. The unified graphical presentation may be transmitted to the user access system. In an implementation, the unified graphical presentation may be combined with other materials and transmitted to the user 185. In an implementation, the unified graphical presentation is received by the user access system and transmitted directly to the user 185 without the inclusion of any other materials.

The user access system may be implemented as a web server in an implementation. The user access system, through the use of any suitable interactive web technology, provides an interactive experience to the user 185 through which access to financial card data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 105 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 105 may comprise one or more computing devices 106. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein. An example computing device and its components are described in more detail with respect to FIG. 5.

Examples of software modules 109 may include modules that may be used in conjunction with receiving and processing an application for the financial card 199 for a user 185, providing issuance information and card generation information to the ATM 190, issuing the financial card 199 to the user 185, receiving and providing card customization information, generating web page content for display, and receiving instructions from the user 185, for example. While specific functionality is described herein as occurring with respect to specific modules, the functionality may likewise be performed by more, fewer, or other modules.

Figure 2:
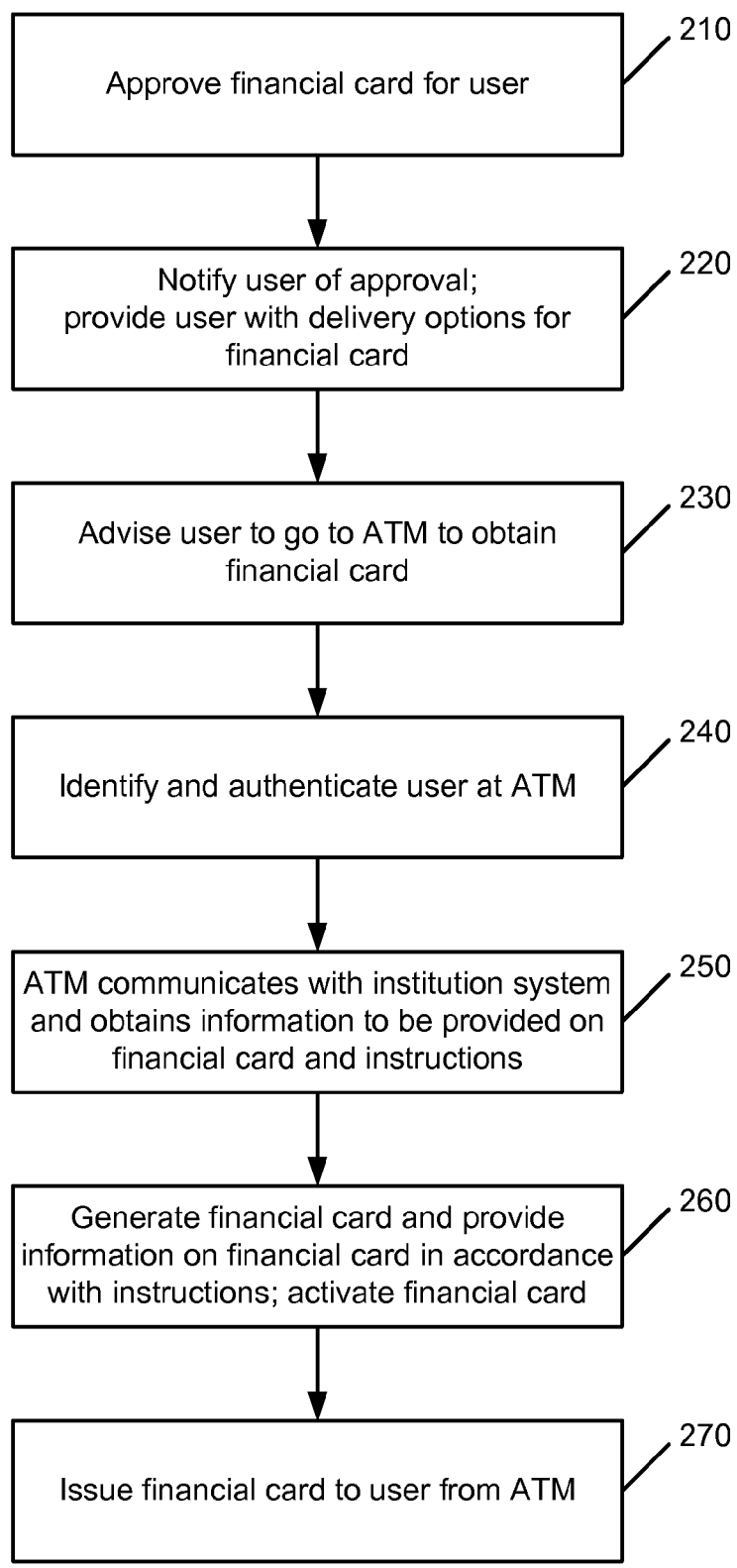
FIG. 2 is an operational flow of an implementation of a method that may be used to provide a financial card via an ATM.

FIG. 2 is an operational flow of an implementation of a method 200 that may be used to provide a financial card via an ATM, such as the financial card 199 via the ATM 190, for example. At 210, a user is approved for a financial card, such as a non-stored value card (e.g., a credit card, a charge card, etc.) or a debit card. The approval may be provided pursuant to the user applying for the financial card via an application. At 220, the user may be notified of the approval. The notification may be provided by any known techniques, such as via email, a website, instant messaging, text messaging, web chat, phone, facsimile, mail, etc.

At 230, the user may be advised to go to an ATM to obtain the financial card. The instructions advising the user to go to an ATM may be sent as an advisory with the notification at 220 or sent separately, and may be provided by any known techniques, such as via email, a website, instant messaging, text messaging, web chat, phone, facsimile, mail, etc. The advisory may comprise a listing of one or more ATMs that may generate the financial card and issue the financial card to the user. The user may go to any of the ATMs provided in the listing in order to receive the financial card.

In an implementation, after being approved for the financial card, the user may be notified of the approval (e.g., at 220) and provided with various delivery options as to how they would like to receive the card, such as through the mail or from an ATM. The user may provide their delivery option selection, and if the user would like to receive the card via the ATM, the user may provide that delivery option selection to the institution and processing may continue (e.g., at 230).

At 240, the user may go to the ATM and may be identified and authenticated at the ATM. Any known identification and authentication technique(s) may be used. Identification and authentication may be performed by the ATM alone or in conjunction with the institution system. In an implementation, the ATM may communicate with the institution system over a communications network and identification and authentication information and instructions may be passed between the ATM and the institution system. The user may select to have the financial card issued. The user may provide such a selection or instructions to the ATM via the interface provided between the user and the ATM (e.g., the keypad and display of the ATM).

At 250, the ATM may communicate with the institution system and obtain the information that is to be provided on the financial card. The institution system may provide information to the ATM such as card number, user name, security code, expiration date and other information that is to be embossed, printed, and/or encoded onto the card. Instructions may be provided as the information to be provided on the card, the placement of the information, the technique(s) used to provide the information on the card, designs or images to be provided on the card, etc. The institution may retrieve such information from storage associated with the user, the approved financial card application of the user, and/or an account of the user, for example.

At 260, the ATM may generate the financial card and provide the information on the financial card in accordance with instructions provided by the institution system. The information may be provided by embossing, printing, encoding, etc. onto a blank card that is stored at the ATM (e.g., one of the blank cards 192). At 270, the ATM may issue the financial card to the user. In this manner, the user may receive the financial card from the ATM (e.g., an ATM of their choosing) at their convenience. The user does not have to wait for the card to arrive in the mail and the risk of the card being intercepted in the mail is eliminated.

In an implementation, the financial card may be activated prior to dispensing the financial card to the user. In this manner, upon receiving the financial card at 270, the user may use the financial card without further interaction with the ATM or the institution to activate the financial card. Alternately, the financial card that is issued to the user may be deactivated and the user may have to interact with the ATM or the institution to activate the card, e.g., by acknowledging receipt of the card via the ATM or the institution, by requesting activation, etc. Known financial card activation techniques may be used.

Figure 3:
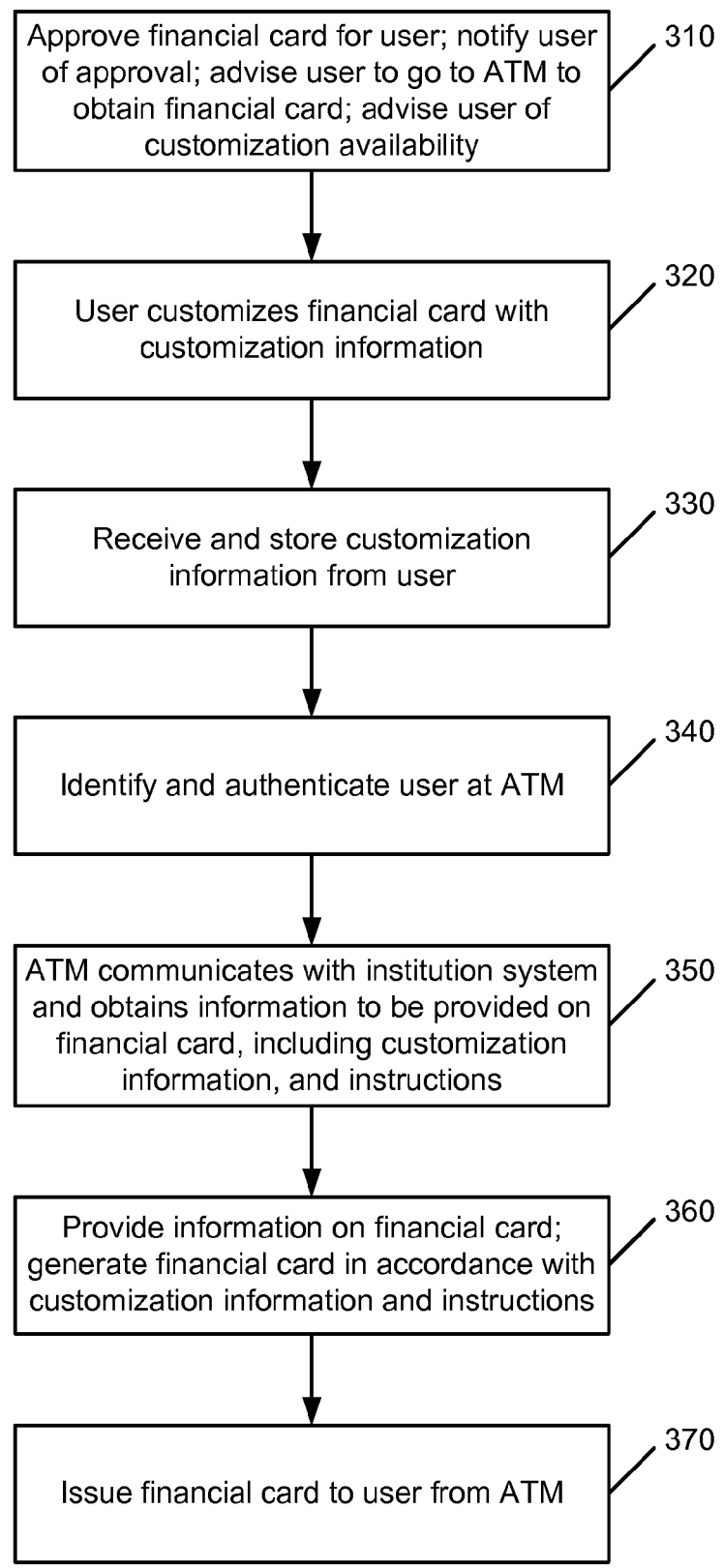
FIG. 3 is an operational flow of another implementation of a method that may be used to provide a financial card via an ATM.

FIG. 3 is an operational flow of another implementation of a method 300 that may be used to provide a financial card via an ATM, such as the financial card 199 via the ATM 190, for example. At 310, a user is approved for a financial card and may be notified of the approval and advised to go to an ATM to obtain the financial card. The user may be notified about the availability of customization of the financial card. The notification may be provided with information regarding the approval or advisory to go to an ATM or the notification may be provided separated. The notification may be provided by any known techniques, such as via email, a website, instant messaging, text messaging, web chat, phone, facsimile, mail, etc.

At 320, the user may customize the financial card, such as the design(s), image(s), and/or layout of the financial card. In an implementation, the user may log onto a website associated with the institution system and select and/or provide designs, images, and/or layouts pursuant to instructions provided. At 330, the customization information may be received by the institution system and stored in storage associated with the user, an account of the user, or the approved financial card application, for example.

At 340, similar to 240, the user may go to the ATM and may be identified and authenticated at the ATM. At the ATM, the user may select to have the ATM print and issue the financial card.

At 350, similar to 250, the ATM may communicate with the institution system and obtain the information that is to be provided on the financial card and associated instructions. Additionally, customization information that had been provided from the user to the institution system may be retrieved from storage by the institution system and provided to the ATM. Instructions regarding the implementation of the customization information may also be provided to the ATM.

In an implementation, instead of the user providing customization information to the institution system (e.g., at 320-330), the user may provide customization information to the ATM, e.g., at 350. The user may interact with the ATM (e.g., via the keypad and display of the ATM) and may select and/or provide one or more designs, images, and layouts for the financial card. In an implementation, the user may upload a design or an image from a user computing device, such as a mobile device, to the ATM. The uploaded design or image may be used to generate customization information for the financial card.

At 360, the ATM may provide the information on the financial card in accordance with the instructions received from the institution system and/or the user. The financial card may be generated and customized with customization information that had been received from the institution system and/or the user. At 370, the ATM may issue the financial card to the user.

Figure 4:
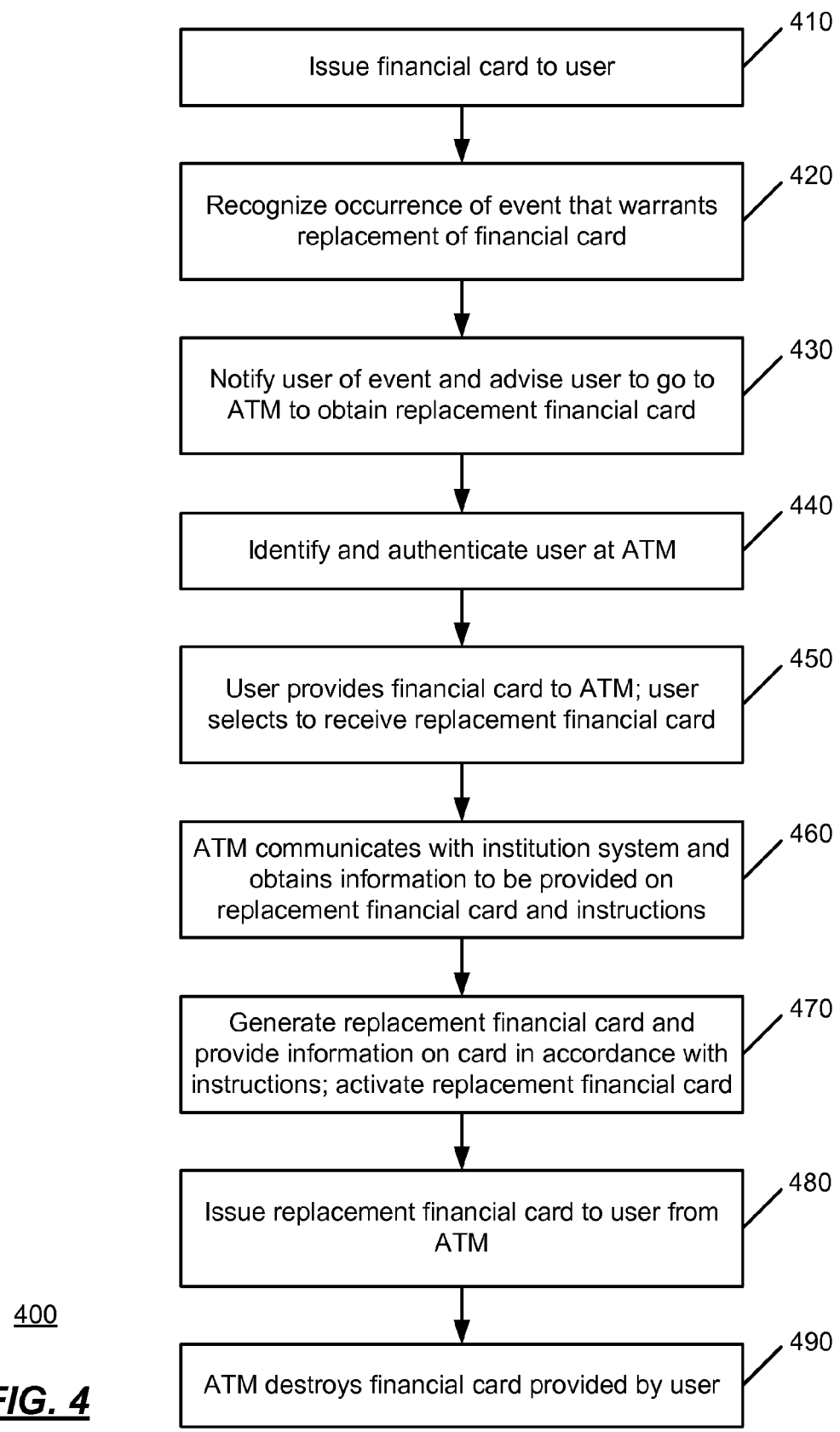
FIG. 4 is an operational flow of another implementation of a method that may be used to provide a financial card via an ATM.

FIG. 4 is an operational flow of another implementation of a method 400 that may be used to provide a financial card via an ATM, such as the financial card 199 via the ATM 190, for example. At 410, a financial card may be issued to a user. The financial card may be issued in any manner, such as via an ATM (e.g., as described above with respect to the methods 200 or 300) or via mail.

At some point, at 420, an event may occur in which a replacement financial card may be warranted. The institution system may recognize an occurrence of the event. The event may an expiration of the financial card or a compromise of the financial card (e.g., the card itself is lost or stolen, the card number is stolen, etc.), for example. At 430, in an implementation, the user may be notified of the event by the institution system and may be advised to go to an ATM to obtain the replacement financial card. Alternately, the user may notify the institution system of the event and in response the institution system may advise the user to go to an ATM to obtain the replacement financial card.

In an implementation, at 440, the user may go to the ATM and may be identified and authenticated at the ATM, similar to that described with respect to 240. Alternately, the user may insert the financial card into the ATM and may provide the appropriate PIN in order to be identified and authenticated. Pursuant to the identification and authentication, in an implementation, the institution system may instruct the ATM to ask the user if the user would like a replacement card to be issued at the ATM.

At 450, the user may insert the financial card into the ATM (if it was not previously provided at 440, for example). The user may select to issue a replacement card.

In an implementation, if the financial card has expired or is set to expire within a certain amount of time (e.g., 1 month, 6 weeks, 60 days, etc.), the ATM may alert the user and may provide the user with an option to have a replacement card issued at the ATM. In such a case, the ATM may be recognizing an occurrence of an event that warrants replacement of the financial card.

At 460, the ATM may communicate with the institution system and obtain the information that is to be provided on the replacement financial card. At 470, the ATM may generate the replacement financial card and provide the information on the replacement financial card, and at 480, the ATM may issue the replacement financial card to the user. Operations 460, 470, and 480 are similar to operations 250, 260, and 270, respectively described with respect to the method 200 and their further descriptions are omitted for brevity.

In an implementation, at 490, the ATM may destroy the previously issued financial card that had been provided by the user (e.g., at 450). Alternately, the ATM may instruct the user to destroy the previously issued financial card.

Although the examples described herein may be directed to financial cards issued by the institution affiliated with the institution system, the techniques may be used with respect to any financial cards, such as financial cards issued by a third party or an entity that is separate from the institution system or unaffiliated with the institution system.

Figure 5:
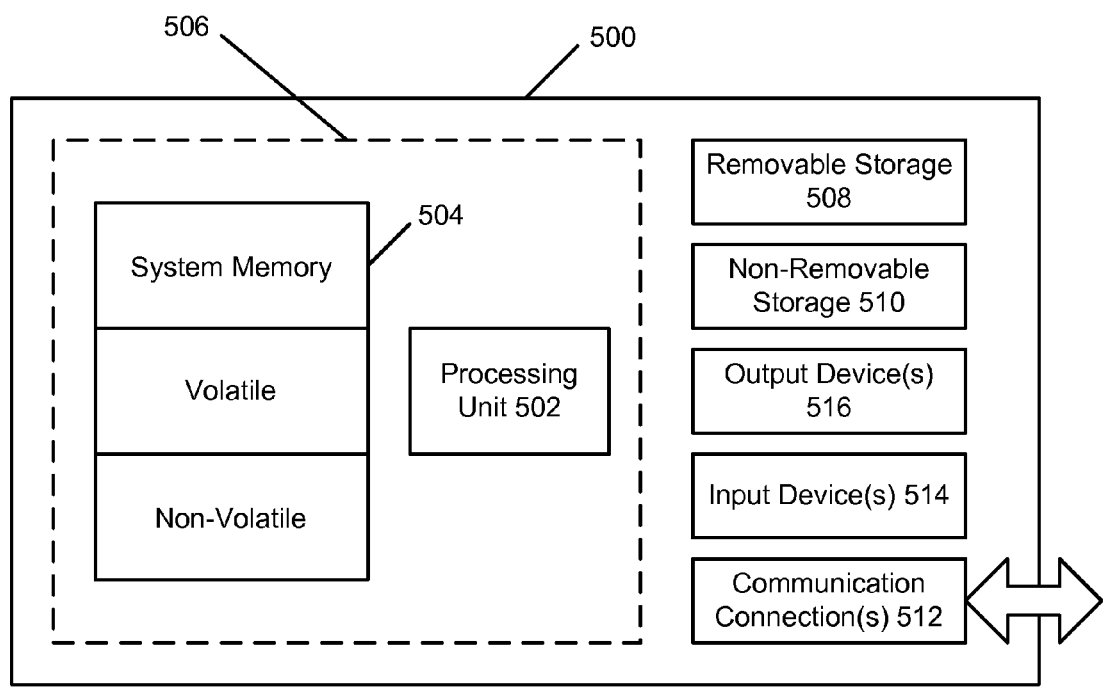
FIG. 5 is a block diagram of an example computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and system memory 504. Depending on the exact configuration and type of computing device, system memory 504 may be volatile (such as RAM), non-volatile (such as read-only memory (ROM), flash memory, etc.), or some combination of the two. This most basic configuration is illustrated in FIG. 5 by dashed line 506.

Computing device 500 may have additional features and/or functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer-readable media. Computer-readable media can be any available media that can be accessed by computing device 500 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 504, removable storage 508, and non-removable storage 510 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may also contain communication connection(s) 512 that allow the computing device 500 to communicate with other devices. Communication connection(s) 512 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for providing a replacement financial card via an automated teller machine (ATM) comprising:
    at least one subsystem that receives an identification of a user comprising a financial card at the ATM;
    at least one subsystem that recognizes that the financial card has expired or will expire within a time period;
    at least one subsystem that notifies the user at the ATM that the financial card has expired or will expire within the time period and offers to provide a replacement financial card to the user at the ATM;
    at least one subsystem that receives a selection from the user to provide the replacement financial card at the ATM;
    at least one subsystem that receives information to be provided on the replacement financial card at the ATM;
        wherein the at least one subsystem that receives information to be provided on the replacement financial card at the ATM comprises:
        at least one subsystem that receives information from an institution system that has approved issuance of the replacement card, and
        at least one subsystem that receives information from the user at the ATM;
    at least one subsystem that generates the replacement financial card comprising the information at the ATM, wherein the at least one subsystem that generates the replacement financial card at the ATM comprises at least one subsystem that retrieves a blank card from storage at the ATM and provides the information on the blank card, wherein the information is provided on the blank card by at least one of embossing or printing the information on the blank card; and
    at least one subsystem that issues the replacement financial card from the ATM.

2. The system of claim 1, further comprising at least one subsystem that provides activation information to the ATM to activate the financial card for the user.

3. The system of claim 1, wherein the information received from the institution comprises a number for the replacement financial card, a user name, a security code, and an expiration date, wherein the information received from the user at the ATM comprises customization information, and wherein the customization information comprises at least one of a design or image.

4. The system of claim 3, wherein the at least one subsystem that receives information provided by the user at the ATM comprising customization information receives the customization information at the ATM via the user interacting with the ATM through the keypad and/or display of the ATM.

5. The system of claim 3, wherein the at least one subsystem that receives the information provided by the user comprising the customization information receives the customization information at the ATM via the user uploading the customization information to the ATM from a mobile device.

6. The system of claim 1, further comprising:
    at least one subsystem that recommends that the user destroy the financial card; and
    at least one subsystem that destroys the financial card at the ATM.

7. A non-transitory computer-readable medium comprising computer-readable instructions for providing a replacement financial card via an automated teller machine (ATM), said computer-readable instructions comprising instructions that:
    recognize an occurrence of an event that warrants a replacement of a financial card;
    notify the user of the event;
    approve the replacement financial card for a user;
    provide to the user a list of ATMs capable of generating the replacement financial card;
    receive a selection of one of the listed ATMs from the user;
    obtain information to be provided on the replacement financial card, wherein the information comprises a number for the replacement financial card, a user name, a security code, customization information, and an expiration date, wherein the customization information is obtained from the user, the customization information comprising at least one of a design or image;
    provide the information to the ATM, the ATM generating the replacement financial card comprising the information and issuing the financial card to the user; and
    provide activation instructions to the ATM to activate the financial card prior to dispensing the financial card.

8. The non-transitory computer-readable medium of claim 7, wherein the replacement financial card is a non-stored value card.

9. The non-transitory computer-readable medium of claim 7, wherein the replacement financial card is one of a credit card, a charge card, or a debit card.

10. The non-transitory computer-readable medium of claim 7, wherein the event is an expiration of the financial card.

11. The non-transitory computer-readable medium of claim 7, wherein the event is a compromise of the financial card.

12. The non-transitory computer-readable medium of claim 7, wherein the list of ATMs provided to the user comprise ATMs that are affiliated with the issuer of the financial card.

13. The non-transitory computer-readable medium of claim 7, further comprising instructions that instruct the user to destroy the financial card that has been replaced.

14. A system for providing a replacement financial card via an automated teller machine (ATM), comprising:
    at least one subsystem that issues a financial card to a user;
    at least one subsystem that recognizes an occurrence of an event that warrants a replacement of the financial card;
    at least one subsystem that notifies the user of the event;
    at least one subsystem that provides the user with a list of ATMs capable of generating the replacement financial card;
    at least one subsystem that receives a selection of one of the listed from the user; and at least one subsystem that issues the replacement financial card to the user from the selected ATM comprising:
  at least one subsystem that authenticates the user at the ATM;
  at least one subsystem that receives information to be provided on the replacement financial card at the ATM;
  at least one subsystem that generates the financial card comprising the information at the ATM; and
  at least one subsystem that provides activation instructions to the ATM to activate the financial card prior to dispensing the financial card.

15. The system of claim 14, wherein the at least one subsystem that receives information to be provided on the replacement financial card at the ATM comprises:
  at least one subsystem that receives information from an institution system that has approved issuance of the replacement card; and
  at least one subsystem that receives information from the user at the ATM.

16. The system of claim 15, wherein the information received from the institution comprises a number for the replacement financial card, a user name, a security code, and an expiration date, wherein the information received from the user at the ATM comprises customization information, wherein the customization information comprises at least one of a design or image.

17. The system of claim 16, wherein the at least one subsystem that receives information provided by the user at the ATM comprising customization information receives the customization information at the ATM via the user interacting with the ATM through the keypad and/or display of the ATM.

18. The system of claim 16, wherein the at least one subsystem that receives the information provided by the user comprising the customization information receives the customization information at the ATM via the user uploading the customization information to the ATM from a mobile device.

19. The system of claim 14, further comprising at least one subsystem that destroys the replaced financial card.

* * * * *